(12) United States Patent  
Chiasson et al.

(10) Patent No.: US 8,370,659 B2
(45) Date of Patent: Feb. 5, 2013

(54) SYSTEMS AND METHODS FOR TIME-BASED MANAGEMENT OF BACKUP BATTERY LIFE IN MEMORY CONTROLLER SYSTEMS

(75) Inventors: Shane Chiasson, Pflugerville, TX (US); Anand Nunna, Round Rock, TX (US); Clark C. Bruderer, Cedar Park, TX (US); Ligong Wang, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 581 days.

(21) Appl. No.: 12/586,368

(22) Filed: Sep. 21, 2009

(65) Prior Publication Data

US 2011/0072280 A1 Mar. 24, 2011

(51) Int. Cl.
*G06F 1/26* (2006.01)
(52) U.S. Cl. .................. 713/320; 713/300; 713/310
(58) Field of Classification Search .................. 713/300, 713/310, 320
See application file for complete search history.

(56) References Cited

U.S. PATENT DOCUMENTS

| | | | |
|---|---|---|---|
| 5,493,665 A | | 2/1996 | Eisenberg |
| 5,510,809 A | | 4/1996 | Sakai et al. |
| 5,640,081 A | * | 6/1997 | Austin et al. .................. 320/127 |
| 5,701,980 A | * | 12/1997 | Lee .................................. 191/4 |
| 6,501,249 B1 | * | 12/2002 | Drori ............................ 320/149 |
| 6,558,829 B1 | | 5/2003 | Faris et al. |
| 7,366,950 B2 | * | 4/2008 | Itoh et al. ......................... 714/24 |
| 7,391,184 B2 | * | 6/2008 | Luo et al. ...................... 320/137 |
| 7,536,203 B2 | | 5/2009 | Elwan et al. |
| 7,840,840 B2 | * | 11/2010 | Takahashi et al. .............. 714/14 |
| 2006/0271800 A1 | * | 11/2006 | Li et al. ......................... 713/300 |
| 2009/0146610 A1 | * | 6/2009 | Trigiani ........................ 320/119 |
| 2009/0278522 A1 | * | 11/2009 | Kernahan et al. ............. 323/299 |

\* cited by examiner

*Primary Examiner* — Kim Huynh
*Assistant Examiner* — Zahid Choudhury
(74) *Attorney, Agent, or Firm* — O'Keefe, Egan, Peterman & Enders LLP

(57) ABSTRACT

Systems and methods that may be implemented for time-based management of storage memory controller (e.g., RAID controller) backup battery life in information handling systems by limiting the backup battery system operation time in order to save energy, reduce the impact of leakage current, and prolong memory controller backup battery shelf life while at the same time meeting requirements of back-up time for storage/server applications. The disclosed systems and methods may be implemented, for example, by providing a battery system controller that implements a pre-set memory controller backup battery operation time, in combination with a hardware-controlled mechanism that extends backup battery system operation time by disabling one or more current leakage paths within the storage memory controller circuitry.

27 Claims, 8 Drawing Sheets

SYSTEMS AND METHODS FOR TIME-BASED MANAGEMENT OF BACKUP BATTERY LIFE IN MEMORY CONTROLLER SYSTEMS

FIELD OF THE INVENTION

This invention relates generally to information handling systems and, more particularly, to management of battery life in memory controller systems of information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and methods for controlling data transfer to and from a memory storage system are known in the art. For example, FIGS. 1 and 2 illustrate examples of such known prior art systems. FIG. 1 shows a prior art information handling system 100 having a server 101 coupled to a memory storage system 102. The information handling system 100 may include a storage memory controller card within or independent of the server 101. FIG. 2 shows a prior art storage memory controller card with battery back up and a discharge circuit that may be coupled to a redundant array of independent disks (RAID) memory system. A RAID system is a data storage system wherein data is distributed across a group of storage hard disk drives functioning as a small storage unit. Often, information stored on each disk is duplicated on other disks in the array, creating redundancy to ensure no information is lost if disk failure occurs.

An exemplary RAID controller circuit 200, for example a PowerEdge RAID Controller (PERC) card available from Dell, Inc., is shown in FIG. 2. As shown in FIG. 2, the controller circuit 200 includes a cache memory 202 to improve storage performance as described below. The cache memory 202 may be for example DRAM memory such as 256 MB DDR2 memory. During operation of the controller circuit 200, user data may be transferred to/from the controller circuit 200 from/to the RAID hard disk drives (not shown in FIG. 2). As part of the transfer, prior art systems typically store data in the cache memory 202 as part of the transfer of the data to/from the RAID disk drives. If a system power loss occurs it is advantageous to be able to maintain the data transfer of the data that has already been staged in the memory cache. Thus, a backup battery system 204 containing an integrated smart battery controller or Battery Management Unit (BMU) 254 is utilized to provide power to the cache memory 202 so that the memory cache does not lose the data that has not yet been transferred. The battery power may thus power the memory cache until the system power becomes stable again so that data in the cache may then be reliably transferred to the RAID hard disk drives. In one example, the backup battery system 204 provides power to the memory 202 via a DC to DC converter 203, which may provide a 1.8V 1 W power source to the memory 202.

Over time, the health of backup battery 204 can degrade such that the total charge capacity can be significantly less than that of the original battery rating. Such degradation will impact the ability to help ensure the proper transfer of data during a power loss as described above and it is desirable to determine if backup battery 204 has degraded to the point that it does not have sufficient power to accomplish this task. To determine the health of the battery system 204, the controller circuit 200 performs a learn cycle, which includes discharging the battery system 204 completely, then recharging it to its maximum capacity. During the recharge cycle, a management controller measures a charge rate and time to determine the total charge capacity of the battery system 204, and thus its health. Current art methods of discharging a battery system 204 utilize a set of power resistors to drain the charge from the battery system 204 at a rate of 4 W.

Other exemplary portions of the prior art RAID controller card 200 will now be described. The battery system 204 is charged by a charger 206 which is provided power through by a PCI Express X8 Card Edge Connector 205. The battery system 204 sends power to a discharge circuit 211 which include power resistors 215 and a switch 217. When testing for the health of the battery system 204, the discharge circuit 211 receives input from a RAID processor 208 which turns on the switch 217 and thus discharges the battery system 204 through the power resistors 215. The Card Edge Connector 205 provides power to a second DC to DC converter 207. The DC to DC converter 207 provides a plurality of voltage supplies for operating the various components of the circuit during normal non-power loss situations (for example power is shown as being provided to the RAID processor 208). For example, the DC to DC converter 207 may be rated to provide 1.8V 21 W power. Power may be provided from the DC to DC converter 207 to the cache memory 202 through an isolation circuit 210. The isolation circuit 210 is responsive to power good logic 209. When a power loss situation occurs, power good logic 209 sends a signal to the isolation circuit 210 so that the input power supply line to the cache memory will be isolated from other circuitry (this isolates the input power supply line to receive battery power without the battery power being drained to other circuitry on the controller card 200). As shown, controller card 200 also includes battery system data bus (SMBus) 290 for providing battery state information, such as battery voltage, to RAID controller or processor 208.

When a graceful shutdown of RAID controller circuit 200 occurs, backup battery 204 does not power memory 202 of RAID controller circuit 200. However, current drain on battery 204 still occurs due to result of leakage current, which is the driving factor for the shelf life of backup battery 204.

It is common for servers purchased by businesses customers from computer manufacturers to have long deployment times. For example, department or discount stores may place purchase orders for large numbers of servers, and then to store these servers in various local warehouses across the world. When the store has a server failure, a new system is immediately pulled from the nearest local warehouse to replace the failed system. In some cases, the new replacement system that is being deployed may have been sitting in the warehouse in an inactive state for as long as 2 years. This type of long shelf life can be problematic for RAID controller cards, which contain a battery such as battery system 204 of FIG. 2. The integrated smart battery controller of battery system 204 combined with the natural discharge of the battery, can provide a load that depletes the battery charge in as little as six months.

Two methods are commonly employed to limit battery discharge from battery packs in smart battery applications and battery gas gauge designs of portable information handling systems such as notebook computers to maximize battery run-time, which is critical for portable information system operation. These methods may also be used by BMU 254 of battery system 204 of the RAID controller circuit 200 of FIG. 2 to control discharge time from battery cells 258 by discharge field effect transistor ("FET") 252. These two methods are illustrated in the plot of voltage and relative state of charge (RSOC) versus battery capacity in FIG. 3 for battery backup system 204 under current leakage conditions, and are known as end of discharge voltage (EDV) and RSOC methods. EDV may be found used in almost all gas gauge designs of portable information handling system battery packs (and is also used in RAID controller battery backup packs), and is illustrated by point B in FIG. 3 where battery voltage is discharged from 4.2 volts to a specified end voltage of 3.0 volts in this example, at which point the portable information handling system is shut down at the system level by the operating system running on the main CPU of the system. A RSOC method is a default power management methodology employed by some computer main operating systems such as Microsoft Windows, and is illustrated by point A in FIG. 3 where the battery is discharged to a specific relative charge percentage (e.g., 3% of full charge in this case) before the operating system running on the main CPU of the system takes steps to reduce or terminate power consumption at the system level (e.g., by shutting down the system).

SUMMARY OF THE INVENTION

Disclosed herein are systems and methods that may be implemented for time-based management of memory controller system (e.g., RAID memory controller system) backup battery life in information handling systems. The disclosed systems and methods may be implemented to provide time-limited battery operation control to limit a memory controller backup battery system operation time in order to save energy, reduce the impact of leakage current, and prolong memory controller backup battery shelf life while at the same time meeting requirements of back-up time for storage/server applications. Using the disclosed systems and methods, leakage currents in memory controller applications may be limited in one embodiment to prolong memory controller backup battery system shelf life for greater than or equal to two years. The disclosed systems and methods may be implemented using any suitable processing device/s to manage memory controller system battery back up life in a time-based manner. Such processing devices may be internal or external to backup battery system circuitry.

The disclosed systems and methods may be implemented in one embodiment by providing a battery system controller (e.g., battery management unit or gas gauge) that implements a pre-set memory controller backup battery operation time, in combination with a hardware-controlled mechanism within the memory controller circuitry that extends backup battery system operation time by disabling one or more current leakage paths within the memory controller circuitry. Thus, in one embodiment the disclosed systems and methods may be implemented to manage memory controller system backup battery life from within the backup battery system of a storage memory controller system (e.g., a replaceable storage memory controller card) in a manner that is separate and independent from the operating system of the main processor (e.g., CPU) of the information handling system. (e.g., server), the latter of which is not involved with the management of the memory controller system backup battery life. Further, in one embodiment the disclosed systems and methods may be implemented to manage memory controller system backup battery life independent and separate from (i.e., without considering) battery voltage or relative state of charge of a backup battery system. In another embodiment, memory controller system backup battery life may be managed from the system-side circuitry of a storage memory controller system in a manner that is separate and independent from the operating system of the main processor of the information handling system.

In one respect, disclosed herein is an information handling system, including: a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells; at least one switching device coupled in the power path between the one or more battery cells and at least one of the BMU or one or more of the system load components; and at least one processing device. The at least one processing device may be coupled to monitor the status of the memory controller and may be coupled to control the at least one switching device to selectively electrically isolate the one or more battery cells from at least one of the BMU or one or more of the system load components when the at least one processing device detects that the status of the memory controller has been inactive for greater than a predetermined period of time.

In another respect, disclosed herein is a method of managing battery life of a backup battery system of a storage memory controller circuit, the method including the steps of: providing a storage memory controller circuit configured for controlling the transfer of data to and from an external data storage system, the storage memory controller circuit having a system-side circuitry that includes one or more load components that includes a memory controller; providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU); providing at least one switching device coupled in the power path between the one or more battery cells and at least one of the BMU or one or more of the system load components; monitoring the status of the memory controller; and controlling the at least one switching device to selectively electrically isolate the one or more battery cells from at least one of the BMU or one or more of the system load components when the monitored status of the memory controller has been inactive for greater than a predetermined period of time.

In another respect, disclosed herein is a backup battery system configured for coupling to and providing backup power to one or more system load components of a storage memory controller circuit that includes a memory controller, the battery system including: one or more battery cells configured for coupling by a power path to provide electrical power to the one or more system load components of the storage memory controller circuit; a battery management unit (BMU) coupled to receive electrical power from the one or more battery cells via the power path; at least one switching device coupled in the power path between the one or more battery cells and the BMU, or configured for coupling between the one or more battery cells and one or more of the system load components. The BMU may be configured for coupling to monitor the status of the memory controller and for coupling to control the at least one switching device to selectively electrically isolate the one or more battery cells from at least one of the BMU or one or more of the system load components when the BMU detects that the status of the memory controller has been inactive for greater than a predetermined period of time.

With regard to the last respect, the BMU may also be configured to perform one or more gas gauge and charge/discharge routine functions when the BMU detects that the status of the memory controller has been active within the predetermined period of time; and wherein the BMU is configured to perform no gas gauge and charge/discharge routine functions when the BMU detects that the status of the memory controller has been inactive for greater than the predetermined period of time. The BMU may also be configured to: measure the elapsed time since last memory controller activity, perform one or more gas gauge and charge/discharge routine functions when the measured elapsed time is less than or equal to the predetermined period of time, and control the at least one switching device to selectively electrically isolate the one or more battery cells from at least one of the BMU or one or more of the system load components, and perform no gas gauge and charge/discharge routine functions when the measured elapsed time is greater than the predetermined period of time. Further, the backup battery system may be a replaceable battery pack, the BMU may be configured for coupling to a RAID controller card by a system management bus (SMBus), the BMU may be configured to monitor the status of the memory controller by monitoring the SMBus for the presence of valid SMBus communication such that the presence of valid SMBus communication signals on the SMBus indicates that the memory controller is active and absence of the valid SMBus communication signals on the SMBus indicates that the memory controller is inactive.

DESCRIPTION OF ILLUSTRATIVE EMBODIMENTS

Figure 1:
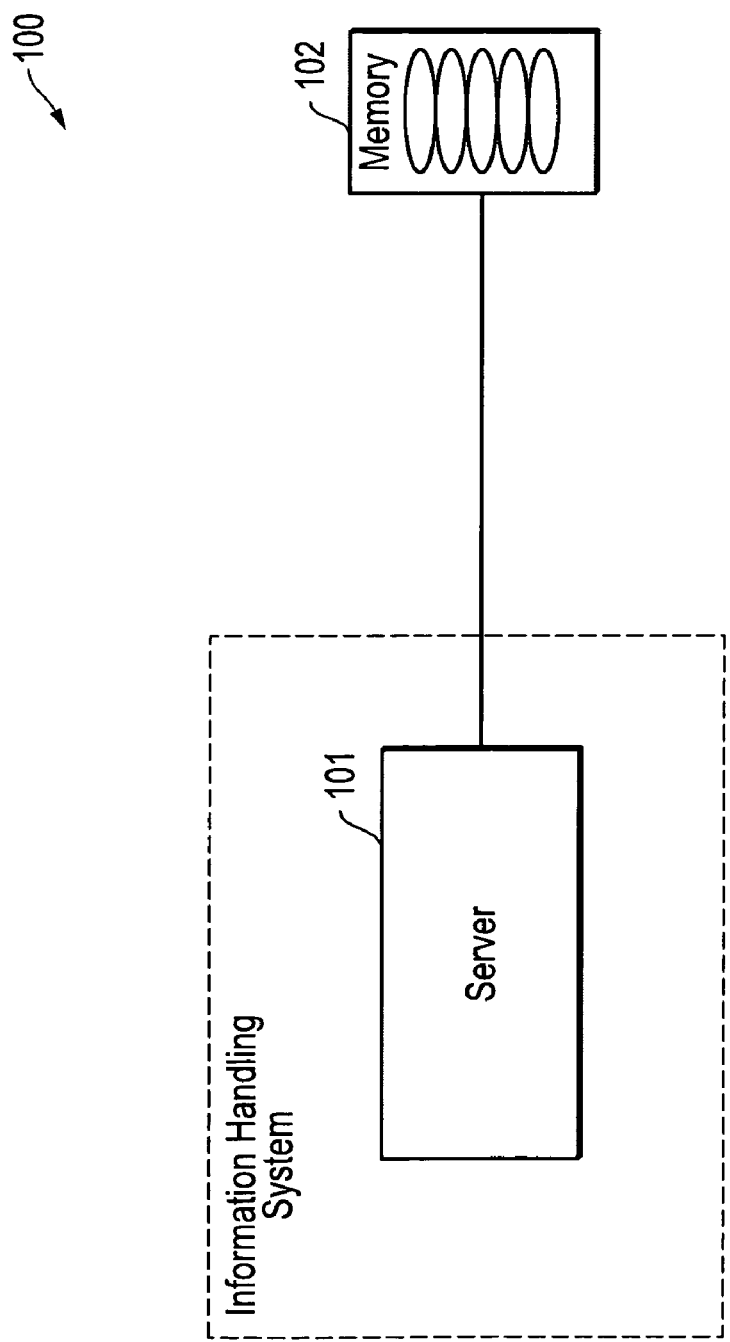
FIG. 1 is a block diagram of a prior art information handling system having a server coupled to a memory system.
Figure 2:
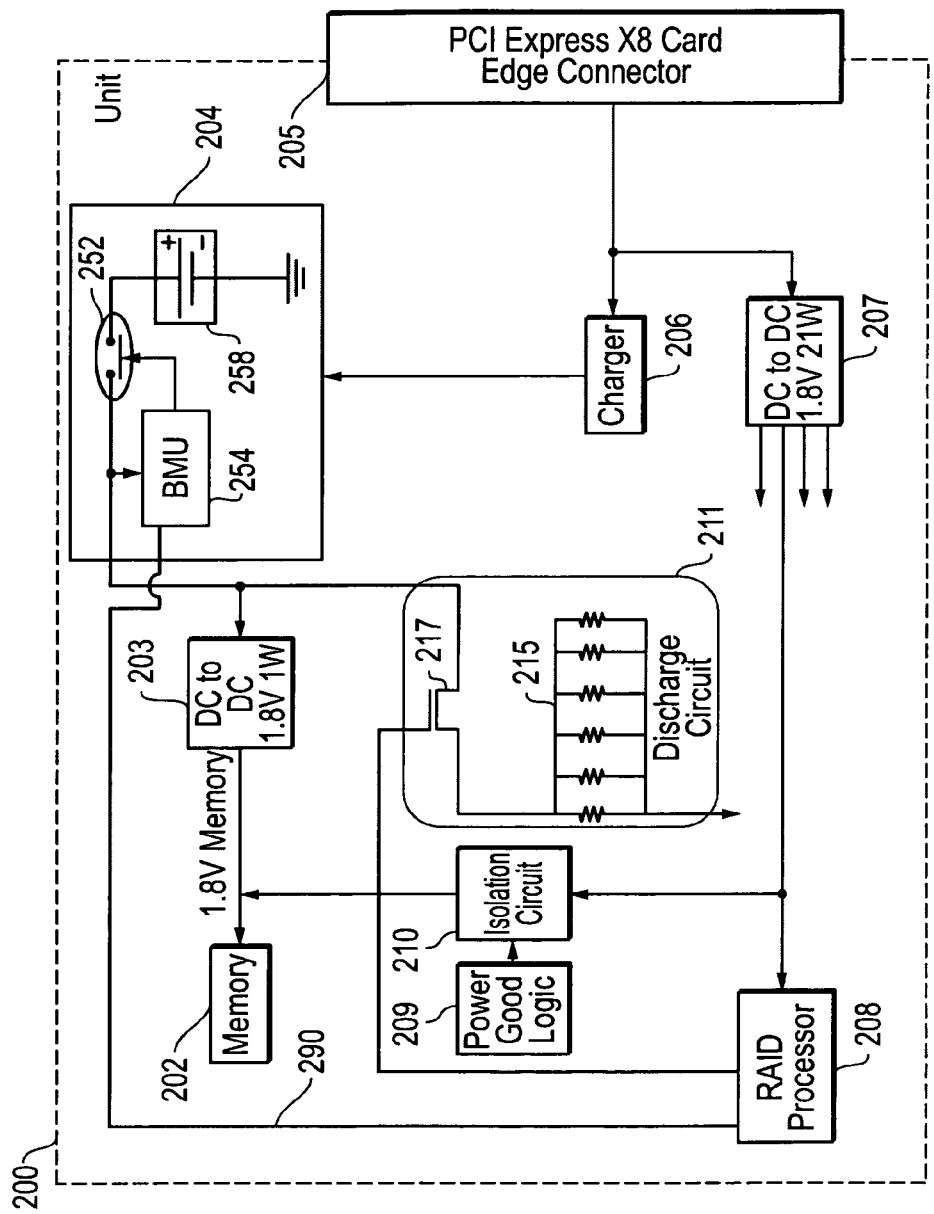
FIG. 2 is a block diagram of prior art memory storage controller card with battery back up and discharge circuit.
Figure 4:
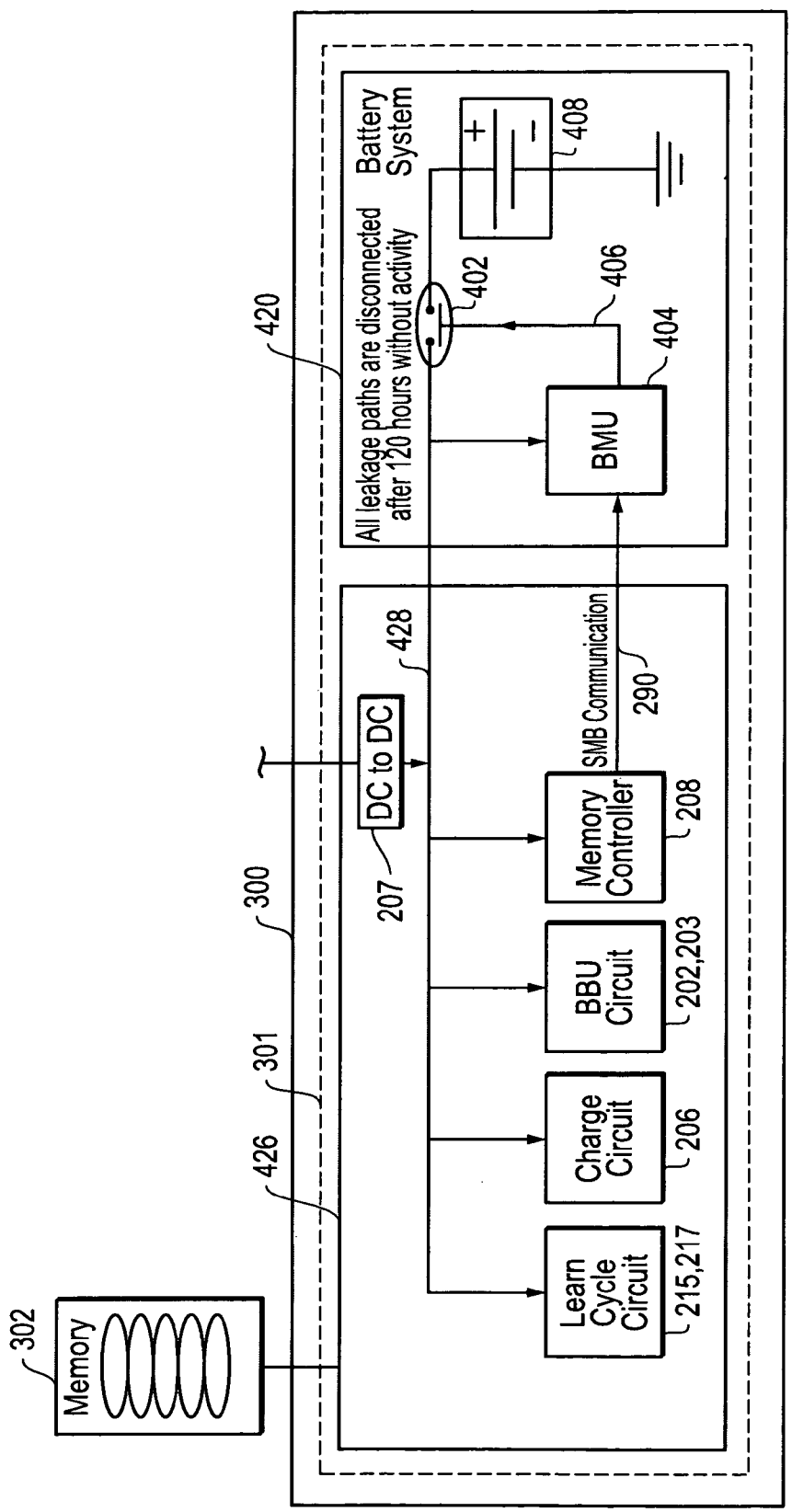
FIG. 4 is a simplified block diagram of an information handling system according to one exemplary embodiment of the disclosed systems and methods.

FIG. 4 is a simplified block diagram of an information handling system 300 for utilizing a storage memory controller circuit 301 configured according to one exemplary embodiment of the disclosed systems and methods for controlling transfer of data to and from a memory system 302 (such as for example, a RAID memory system). Though shown as separate circuits, some or all of the circuits of FIG. 4 may be integrated in a single integrated circuit. In FIG. 4, storage memory controller circuit 301 includes backup battery system (e.g., replaceable smart battery pack) 420 that includes a battery management unit (BMU) 404 and battery cell/s 408 (e.g., lithium batteries) that are coupled by power path 428 to provide current to BMU 404 and to various system load components of memory controller system-side circuitry (e.g., disposed on a PERC circuit card) 426 of memory controller circuit 301. These system-side load components include memory controller 208, battery backup circuitry 202, 203, charger circuitry 206 and learn cycle circuitry 215, 217 the configuration and operation of which have been previously described in relation to memory controller circuit 200 of FIG. 2. Further information on memory controller circuit configuration may be found in U.S. patent application Ser. No. 12/012,141, filed Jan. 31, 2008, entitled "Method And System for Regulating Current Discharge During Battery Discharge Conditioning Cycle" by Wang et al., which is incorporated herein by reference in its entirety.

Still referring to the exemplary embodiment of FIG. 4, BMU 404 may be configured with a microcontroller or other processing device that is responsible for monitoring battery system operation and that is coupled to memory controller 208 by SMBus 290. As shown, a backup battery system 420 is provided with a switch in the form of a discharge field effect transistor ("D-FET") 402 or other suitable electrical switching device 402 that is coupled between battery cell/s 408 and the load components of system-side circuitry 426 of memory controller circuit 301. Switching device 402 may be controlled via control path 406 by BMU 404 so as to selectively disallow flow of leakage current from battery cells 408 to BMU 404 and to the various system-side load components of memory controller circuit 301 as shown.

Figure 5:
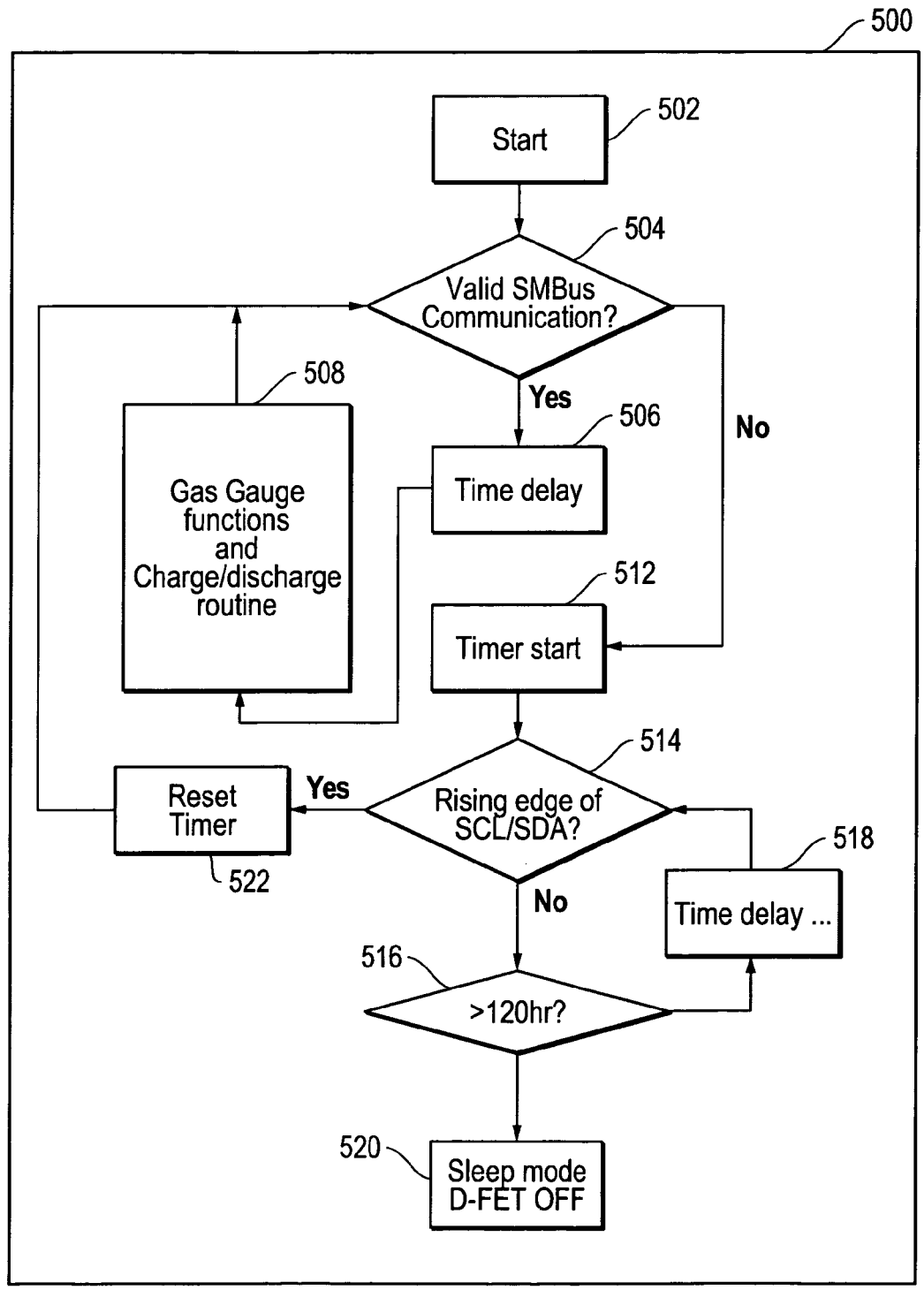
FIG. 5 illustrates methodology according to one exemplary embodiment of the disclosed systems and methods.

In the embodiment of FIG. 4, BMU 404 is configured to implement a pre-set operation time for backup battery system 420 by controlling switching device 402 of backup battery system 420 to selectively allow current flow via power path 428 to BMU 404 and the various other system load components of memory controller circuit 301 in a manner as described further herein. In one embodiment, the pre-set operation time may be set to be equal to less than half of the run time capability supported by battery cells 408 when at full battery capacity. FIG. 5 illustrates time-based algorithm methodology 500 according to one exemplary embodiment in which BMU 404 controls current flow from battery cells 408 to BMU 404 and to load components of system-side circuitry 426 of memory controller circuit 301. As shown methodology 500 starts in step 502 and moves to step 504 where BMU 404 determines if there is a valid SMBus communication from memory controller 208 across SMBus 290. If there is a valid SMBus communication, then this indicates that memory controller 208 is active and methodology 500 proceeds to step 506 where a time delay (e.g., of from about 1 to about 10 seconds) is implemented before BMU 404 proceeds to performing its conventional gas gauge and charge/discharge routine functions (e.g., checking battery voltage and charge current during charging, checking battery voltage and discharge current during discharging, updating gas gauge registers, etc.) in step 508. Methodology then continues by returning to step 504.

Still referring to FIG. 5, if no valid SMBus communication is found occurring on SMBus 290, then methodology 500 proceeds to step 512 where BMU 404 starts a timer. BMU 404 then checks for presence of a communication on SMBus 290 in the form of a rising edge signal (e.g., on SMCL and/or SMDA lines) in step 514 that indicates memory controller 208 is active. If such a rising edge signal is detected in step 514, then the timer is reset in step 522, and methodology 500 returns to step 504 as shown. However, if no rising edge signal is detected in step 514, then methodology 500 proceeds to step 516 where the elapsed time since start of the timer in step 512 is compared to determine if the elapsed time has exceeded a default maximum timer value (e.g., 120 hours or any other period of time that is selected based on operation requirements). If the maximum timer value is not found to have been exceeded in step 516, then methodology 500 proceeds to step 518 where a time delay (e.g., of from about 1 to about 10 seconds) is implemented, before methodology 500 returns to step 514. In the event of no activity detected on SMBus 290, steps 514 through 518 are repeated until the maximum timer value is found to be exceeded in step 516. When this occurs, methodology 500 proceeds to step 520 where BMU 404 turns off D-FET 402 to isolate the BMU 404 and load components of memory controller system-side circuitry 426 from battery cell/s 408. This places memory controller circuit 301 into sleep mode during which substantially no leakage current (e.g., less than about 20 μA) is allowed to flow via power path 428 from battery cell/s 408 to BMU 404 or to load components of system-side circuitry 426 of memory controller circuit 301.

Memory controller circuit 301 will then remain in sleep mode until detection of SMBus communication again on SMBus 290 (e.g., upon detection of rising edge on SMCL and/or SMDA lines or application of external charge voltage to backup battery system 420), at which time memory controller circuit exits sleep mode and returns to normal operation with voltage of battery cell/s 208 high enough to power up BMU 404. In one exemplary embodiment, BMU 404 may be coupled so as to pull down each of SMCL and/or SMDA lines of SMBus 290 via resistors (e.g., 1 Mega-Ohm resistors), making the SMCL and/or SMDA lines low when there is no power on system-side circuitry 426 of memory controller circuit 301, and triggering a rising edge on SMCL and/or SMDA lines when system-side circuitry 426 is powered up to wake the battery up from sleep mode. It will be understood that methodology 500 of FIG. 5 is exemplary only and that any other combination of additional, fewer, and/or alternative steps may be implemented that is suitable for controlling current discharge from a memory controller backup battery to manage backup battery life in accordance with the systems and/or methods described herein.

Figure 3:
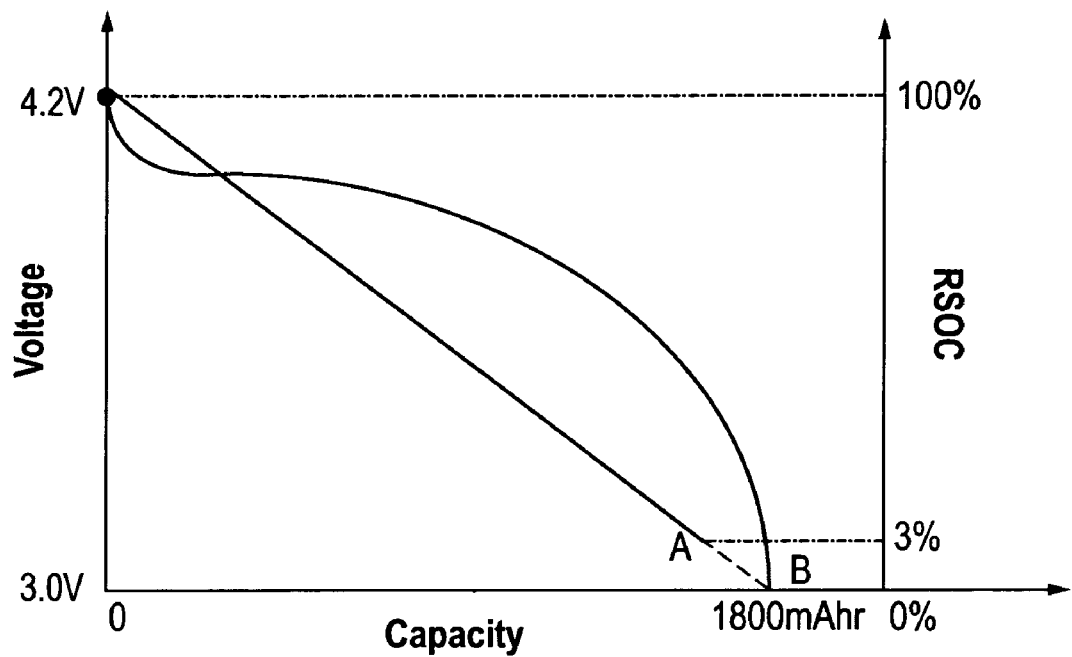
FIG. 3 is a plot of voltage and relative state of charge (RSOC) versus battery capacity for a prior art battery backup system under current leakage conditions.
Figure 6:
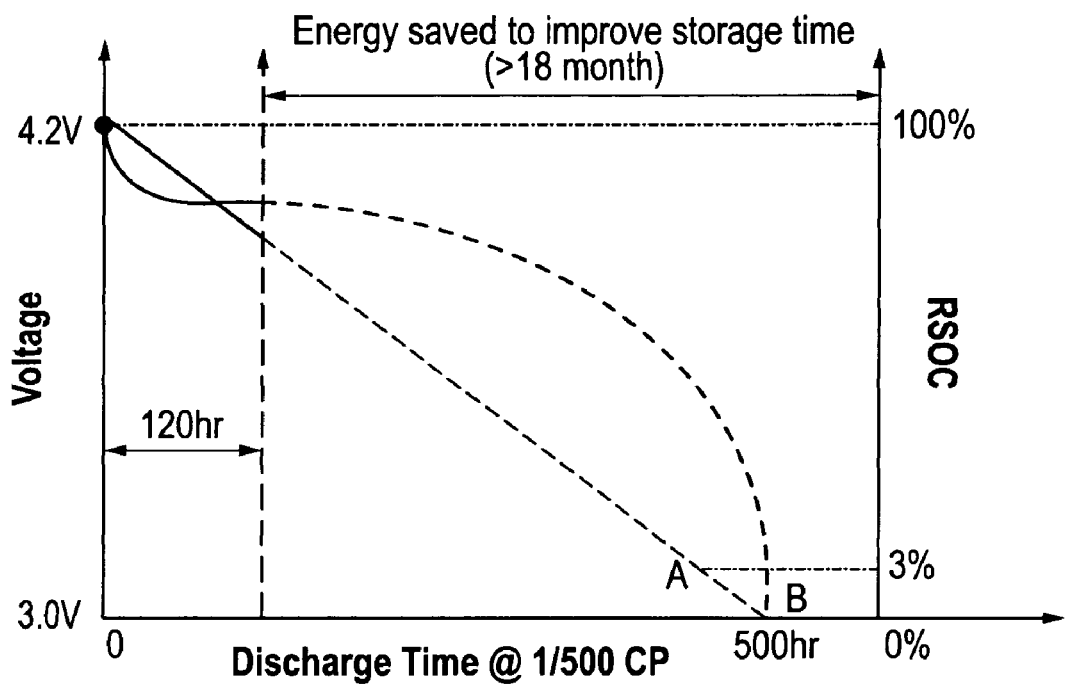
FIG. 6 is a plot of voltage and relative state of charge (RSOC) versus discharge time for a backup battery system according to one exemplary embodiment of the disclosed systems and methods.

FIG. 6 is a plot of voltage and relative state of charge (RSOC) versus discharge time at 1/500 discharge rate in constant power mode for a backup battery system 420 of a memory controller circuit 301 implemented using the methodology 500 of FIG. 5 during an extended period of system inactivity, e.g., such as while a server is stored on the shelf of a warehouse. As shown, current leakage discharge time during memory controller system inactivity is limited to 120 hours when using the methodology 500 of FIG. 5, as opposed to approximately 500 hours of currently leakage discharge time represented by the dashed lines that are exhibited using the prior art methodologies described in relation to FIG. 3. In one embodiment, this translates to greater than about 18 months of additional server storage time that may be realized before memory controller backup battery of the sever is dead.

It will be understood that the particular circuit configuration of FIG. 4 is exemplary only, and that in other embodiments any one or more load components (e.g., BMU 404, memory controller 208, battery backup circuitry 202, 203, charger circuitry 206 and learn cycle circuitry 215, 217, and/or any additional or alternative load components) may be selectively isolated from leakage current from battery cell/s 408 using the methodology described herein.

Figure 7:
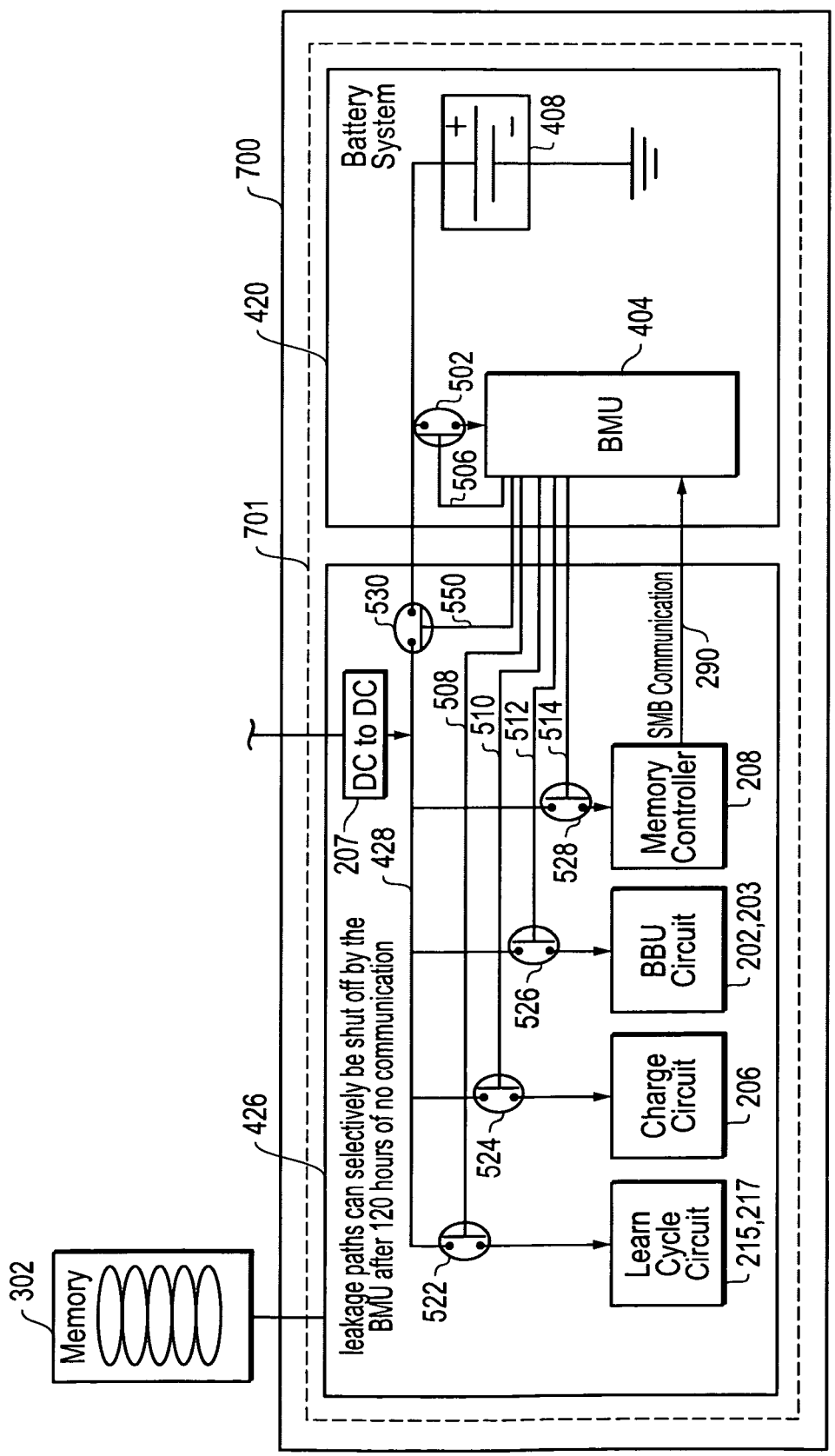
FIG. 7 is a simplified block diagram of an information handling system according to one exemplary embodiment of the disclosed systems and methods.

For example, FIG. 7 is a simplified block diagram of an information handling system 700 for utilizing a memory controller circuit 701 as it may be implement according to an alternate embodiment of the disclosed systems and methods. In FIG. 7, backup battery system 420 and system-side circuitry 426 are provided with individual switches in the form of multiple D-FETs (or other suitable electrical switching devices) 502, 522, 524, 526 and 528 that are each coupled between battery cell/s 408 and a respective one of BMU 404 or one of the individual load components of system-side circuitry 426 of memory controller circuit 701. As shown, each of switching devices 502, 522, 524, 526 and 528 may be controlled via a respective corresponding individual control path 506, 508, 510, 512 or 514 by BMU 404 so as to selectively disallow flow of leakage current from battery cell/s 408 to any one or combination of BMU 404 and individual load components of system-side circuitry 426 of memory controller circuit 701, e.g., after expiration of the time period specified in step 516 of FIG. 5.

Also shown in FIG. 7 is optional D-FET (or other suitable electrical switching device) 530 that is coupled between battery cell/s 408 and the load components of system-side circuitry 426 of memory controller circuit 301. In this embodiment D-FET 530 is provided within system-side circuitry 426 and is controlled via control path 550 by BMU 404 so as to selectively disallow flow of leakage current from battery cells 408 to the various system-side load components of memory controller circuit 701 as shown, and in a manner similar to D-FET 402 of FIG. 4. It will be understood that D-FET 530 is not required to be present in addition to switching devices 502, 522, 524, 526 and 528. Further, in an alternative embodiment, D-FET 530 and its control path 550 may be provided without the presence switching devices 502, 522, 524, 526 and 528.

Figure 8:
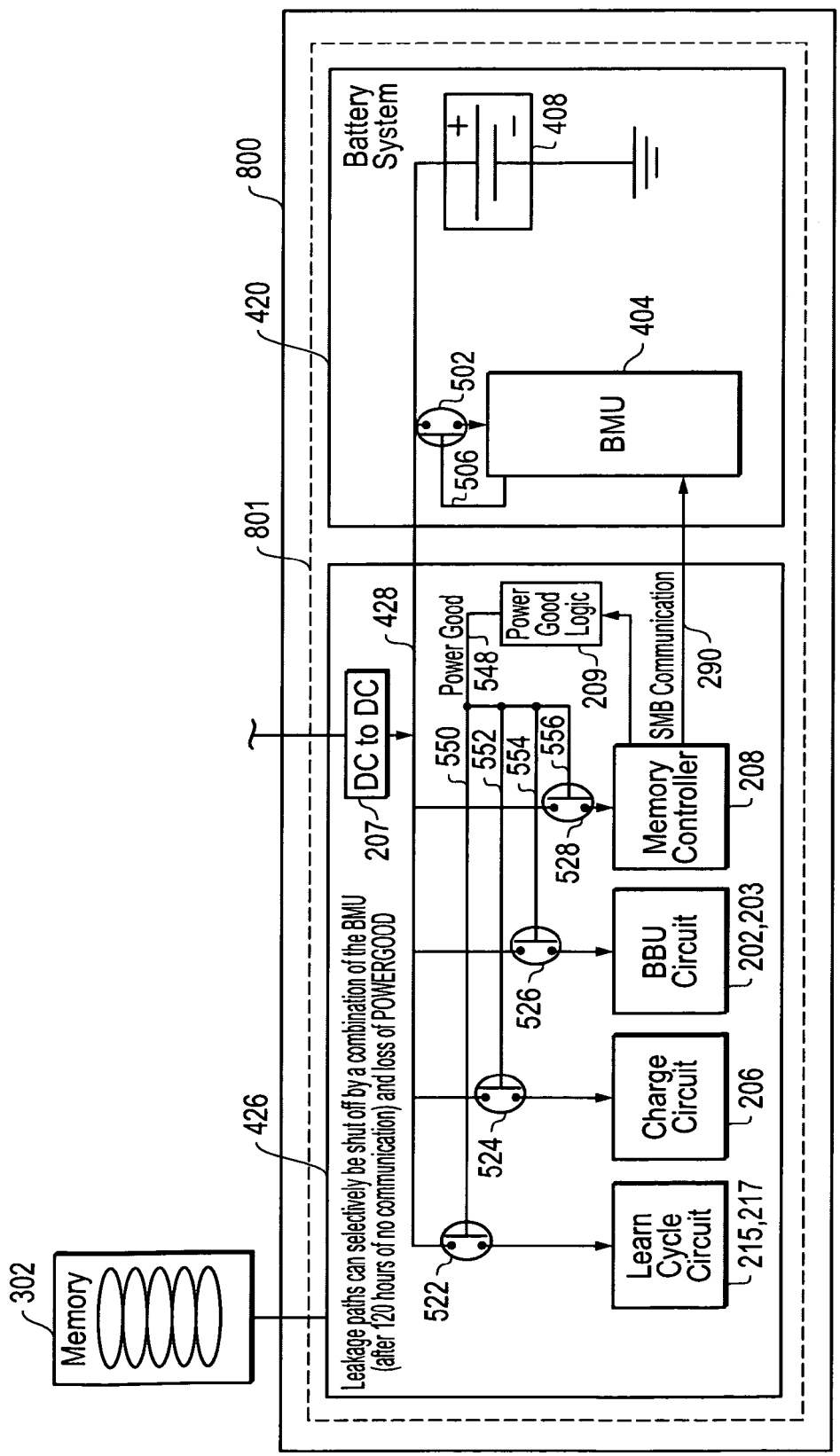
FIG. 8 is a simplified block diagram of an information handling system according to one exemplary embodiment of the disclosed systems and methods.

FIG. 8 is a simplified block diagram of an information handling system 800 for utilizing a memory controller circuit 801 as it may be implemented according to another alternate embodiment of the disclosed systems and methods. In FIG. 8, backup battery system 420 and system-side circuitry 426 are provided with individual switches in the form of multiple D-FETs (or other suitable electrical switching devices) 502, 522, 524, 526 and 528 that are each coupled between battery cell/s 408 and a respective one of BMU 404 or one of the individual load components of system-side circuitry 426 of memory controller circuit 801. As shown, switching device 502 is controlled by BMU 404 via control path 506 to selectively disallow flow of leakage current from battery cell/s 408 to BMU 404, e.g., after expiration of the time period specified in step 516 of FIG. 5. Further, each of switching devices 522, 524, 526 and 528 may be optionally or alternatively controlled via a respective corresponding individual control path 550, 552, 554 and 556 by loss of POWERGOOD signal 548 (e.g., from a power good logic such as logic 209 of FIG. 2) so as to disallow flow of leakage current from battery cell/s 408 to load components of system-side circuitry 426 of memory controller circuit 801 when no external power is present so that power path 428 is isolated from memory controller 208, battery backup circuitry 202, 203, charger circuitry 206 and learn cycle circuitry 215, 217.

In yet another embodiment, a processing device (e.g., microcontroller, CPU, ASIC, FPGA, logic circuitry, etc.) may be provided within the system-side circuitry 426 to control one or more switching devices so as to selectively electrically isolate battery cell/s 408 from at least one of the BMU 404 or one or more of system load components (e.g., memory controller 208, battery backup circuitry 202, 203, charger circuitry 206 and learn cycle circuitry 215, 217) when it is detected that the status of the memory controller 208 has been inactive for greater than a predetermined period of time. For example, power good logic 209 of FIG. 8 may be configured to monitor status of memory controller 208 and to disallow flow of leakage current from battery cell/s 408 to load components of system-side circuitry 426 of memory controller circuit 801, e.g., after expiration of a time period, such as specified in step 516 of FIG. 5. Further optionally, a control signal may be provided from a system-side processor (e.g., such as power good logic 209) to a switching device within a backup battery system (e.g., such as backup battery system 420) to disallow flow of leakage current from battery cell/s 408 to BMU 404 and/or load components of system-side circuitry 426 when it is detected that the Status of the memory controller 208 has been inactive for greater than a predetermined period of time. Examples of such battery system switching devices that may be so controlled by a system-side processing device include switching devices 402 and 502 described herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
   a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells;
   at least one switching device coupled in the power path between the one or more battery cells and each of the BMU and one or more of the system load components; and
   at least one processing device;
   wherein the at least one processing device is coupled to monitor the status of the memory controller and is coupled to control the at least one switching device to selectively electrically isolate the one or more battery cells from each of the BMU and the one or more of the system load components when the at least one processing device detects that the status of the memory controller has been inactive for greater than a predetermined period of time; and
   wherein the at least one processing device is configured to:
      measure the elapsed time since last memory controller activity,
      perform one or more gas gauge and charge/discharge routine functions when the measured elapsed time is less than or equal to the predetermined period of time, and
      control the at least one switching device to selectively electrically isolate the one or more battery cells from each of the BMU and the one or more of the system load components, and perform no gas gauge and charge/discharge routine functions when the measured elapsed time is greater than the predetermined period of time.

2. The system of claim 1, wherein the at least one processing device comprises power good logic included within the memory controller system-side circuitry, the power good logic being configured to disallow flow of current from the one or more battery cells to the one or more system load components at any time that no external power is present.

3. The system of claim 1, wherein the at least one processing device comprises the BMU of the backup battery system; wherein the BMU is configured to perform one or more gas gauge and charge/discharge routine functions when the BMU detects that the status of the memory controller has been active within the predetermined period of time; and wherein the BMU is configured to perform no gas gauge and charge/discharge routine functions when the BMU detects that the status of the memory controller has been inactive for greater than the predetermined period of time.

4. The system of claim 2, wherein the at least one processing device further comprises the BMU of the backup battery system; and where the system further comprises power good logic configured to provide a signal upon detection of loss of external power to the information handling system; wherein the BMU and one or more of the system load components are each coupled to the one or more battery cells by a separate dedicated portion of the power path; wherein a separate dedicated switching device is coupled in the separate dedicated power path portion between the one or more battery cells and each one of the BMU and one or more of the separate system load components; wherein the BMU is coupled to control at least one of the separate switching devices to selectively electrically isolate the BMU from the one or more battery cells in a manner that is independent of the one or more system load components; and wherein the power good logic is coupled to control at least one other separate switching device to electrically isolate each of the system load components from the one or more battery cells.

5. The system of claim 4, where the BMU is included in backup battery system side circuitry that is separate from the memory controller system-side circuitry; where the power good logic is included in the memory controller system-side circuitry; where the one or more system load components of the memory controller system-side circuitry that are each coupled to the one or more battery cells by a separate portion of the power path comprise at least a separate memory controller, separate battery backup circuitry, separate charger circuitry, and separate learn cycle circuitry; and wherein the power good logic is coupled by a respective corresponding individual control path to each of the separate switching devices so as to independently control each of the separate switching devices to selectively electrically isolate each of the memory controller, separate battery backup circuitry, separate charger circuitry, and separate learn cycle circuitry from the one or more battery cells in order to selectively disallow flow of leakage current from the one or more battery cells to any selected one or any selected combination of the individual system load components of the memory controller system-side circuitry in a manner that is independent of the BMU.

6. An information handling system, comprising:
a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells;
at least one switching device coupled in the power path between the one or more battery cells and at least one of the BMU or one or more of the system load components; and
at least one processing device;
wherein the at least one processing device is coupled to monitor the status of the memory controller and is coupled to control the at least one switching device to selectively electrically isolate the one or more battery cells from each of the BMU and the one or more of the system load components when the at least one processing device detects that the status of the memory controller has been inactive for greater than a predetermined period of time;
wherein the at least one processing device comprises the BMU of the backup battery system; and
wherein the BMU is coupled to the memory controller by a system management bus (SMBus); and wherein the BMU is configured to detect the active status of the memory controller by monitoring the SMBus for the presence of valid SMBus communication.

7. The system of claim 6, wherein the storage memory controller circuit is a RAID controller card; wherein the back up battery system is a replaceable smart battery pack; wherein the BMU is coupled to the memory controller by a system management bus (SMBus); wherein the BMU is configured to monitor the status of the memory controller by monitoring the SMBus for the presence of valid SMBus communication; and wherein the presence of valid SMBus communication signals on the SMBus indicates that the memory controller is active and absence of the valid SMBus communication signals on the SMBus indicates that the memory controller is inactive.

8. The system of claim 6, wherein the BMU is configured to pull down at least one of SMCL or SMDA lines of the SMBus to make at least one of the SMCL or SMDA lines low when when there is no external power provided to the memory controller system-side circuitry, and such that a rising edge is triggered on the at least one SMCL or SMDA line when the memory controller system-side circuitry is powered up by external power; and where the BMU is configured to detect the rising edge and respond by controlling the at least one switching device to selectively electrically couple the one or more battery cells to each of the BMU and the one or more of the system load components.

9. An information handling system, comprising:
a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells;
at least one switching device coupled in the power path between the one or more battery cells and at least one of the BMU or one or more of the system load components; and
at least one processing device;
wherein the at least one processing device is coupled to monitor the status of the memory controller and is coupled to control the at least one switching device to selectively electrically isolate the one or more battery cells from each of the BMU and the one or more of the system load components when the at least one processing device detects that the status of the memory controller has been inactive for greater than a predetermined period of time;
wherein the at least one processing device comprises the BMU of the backup battery system; and
wherein the BMU and the one or more system load components are each coupled to the one or more battery cells by a common portion of the power path; wherein the at least one switching device is coupled in the common portion of the power path between the one or more battery cells and each of the BMU and the system load components; and wherein the BMU is coupled to control the at least one switching device to simultaneously electrically isolate both the BMU and the system load components from the one or more battery cells.

10. An information handling system, comprising:
a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells;
at least one switching device coupled in the power path between the one or more battery cells and at least one of the BMU or one or more of the system load components; and
at least one processing device;
wherein the at least one processing device is coupled to monitor the status of the memory controller and is coupled to control the at least one switching device to selectively electrically isolate the one or more battery cells from each of the BMU and the one or more of the system load components when the at least one processing device detects that the status of the memory controller has been inactive for greater than a predetermined period of time;
wherein the at least one processing device comprises the BMU of the backup battery system; and
wherein the BMU and the one or more system load components are each coupled to the one or more battery cells by a separate dedicated portion of the power path; wherein a separate dedicated switching device is coupled in the separate dedicated power path portion between the one or more battery cells and each one of the BMU and the separate system load components; and wherein the BMU is coupled to independently control each of the separate switching devices to selectively electrically isolate each of the BMU and the system load components from the one or more battery cells.

11. The system of claim 10, where the BMU is included in backup battery system side circuitry that is separate from the memory controller system-side circuitry; where the one or more system load components of the memory controller system-side circuitry that are each coupled to the one or more battery cells by a separate portion of the power path comprise at least a separate memory controller, separate battery backup circuitry, separate charger circuitry, and separate learn cycle circuitry; and wherein the BMU is coupled by a respective corresponding individual control path to each of the separate switching devices so as to independently control each of the separate switching devices to selectively electrically isolate each of the BMU, memory controller, separate battery backup circuitry, separate charger circuitry, and separate learn cycle circuitry from the one or more battery cells in order to selectively disallow flow of leakage current from the one or more battery cells to any selected one or any selected combination of the BMU and individual system load components of the memory controller system-side circuitry.

12. A method of managing battery life of a backup battery system of a storage memory controller circuit, the method comprising the steps of:
providing a storage memory controller circuit configured for controlling the transfer of data to and from an external data storage system, the storage memory controller circuit having a system-side circuitry that includes one or more load components that includes a memory controller;
providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU);
providing at least one switching device coupled in the power path between the one or more battery cells and each of the BMU and one or more of the system load components;
monitoring the status of the memory controller;
controlling the at least one switching device to selectively electrically isolate the one or more battery cells from each of the BMU and the one or more of the system load components when the monitored status of the memory controller has been inactive for greater than a predetermined period of time;
using the BMU to perform the steps of monitoring the status of the memory controller and of controlling the at least one switching device;
using the BMU to perform one or more gas gauge and charge/discharge routine functions when the BMU detects that the status of the memory controller has been active within the predetermined period of time; and
using the BMU to perform no gas gauge and charge/discharge routine functions when the BMU detects that the status of the memory controller has been inactive for greater than the predetermined period of time.

13. The method of claim 12, further comprising providing power good logic within the memory controller system-side circuitry; and using the power good logic to perform the steps of monitoring the status of the memory controller and of controlling the at least one switching device to disallow flow of current from the one or more battery cells to the one or more system load components at any time that no external power is present.

14. The method of claim 12, further comprising using the BMU to:
measure the elapsed time since last memory controller activity;
perform one or more gas gauge and charge/discharge routine functions when the measured elapsed time is less than or equal to the predetermined period of time; and
control the at least one switching device to selectively electrically isolate the one or more battery cells from at least one of the BMU or one or more of the system load components, and perform no gas gauge and charge/discharge routine functions when the measured elapsed time is greater than the predetermined period of time.

15. The method of claim 13, further comprising using the BMU to perform the steps of monitoring the status of the memory controller and of controlling the at least one switching device; providing power good logic to provide a signal upon detection of loss of external power to the storage memory controller with the BMU and one or more of the system load components each being coupled to the one or more battery cells by a separate dedicated portion of the power path; providing a separate dedicated switching device coupled in the separate dedicated power path portion between the one or more battery cells and each one of the BMU and one or more of the separate system load components; using the BMU to control at least one of the separate dedicated switching devices to selectively electrically isolate the BMU from the one or more battery cells in a manner that is independent from the one or more system load components; and using the power good logic to control at least one other separate dedicated switching device to electrically isolate each of the system load components from the one or more battery cells.

16. The method of claim 15, further comprising:
providing the BMU as being included in backup battery system side circuitry that is separate from the memory controller system-side circuitry;
providing the power good logic as being included in the memory controller system-side circuitry;
providing the one or more system load components of the memory controller system-side circuitry that are each coupled to the one or more battery cells by a separate portion of the power path to include at least a separate memory controller, separate battery backup circuitry, separate charger circuitry, and separate learn cycle circuitry;
providing the power good logic as being coupled by a respective corresponding individual control path to each of the separate switching devices so as to independently control each of the separate switching devices to selectively electrically isolate each of the memory controller, separate battery backup circuitry, separate charger circuitry, and separate learn cycle circuitry from the one or more battery cells; and
independently controlling each of the separate switching devices to selectively disallow flow of leakage current from the one or more battery cells to any selected one or any selected combination of the individual system load components of the memory controller system-side circuitry in a manner that is independent of the BMU.

17. A method of managing battery life of a backup battery system of a storage memory controller circuit, the method comprising the steps of:
providing a storage memory controller circuit configured for controlling the transfer of data to and from an external data storage system, the storage memory controller circuit having a system-side circuitry that includes one or more load components that includes a memory controller;
providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU);
providing at least one switching device coupled in the power path between the one or more battery cells and each of the BMU and one or more of the system load components;
monitoring the status of the memory controller;
controlling the at least one switching device to selectively electrically isolate the one or more battery cells from each of the BMU and the one or more of the system load components when the monitored status of the memory controller has been inactive for greater than a predetermined period of time;
using the BMU to perform the steps of monitoring the status of the memory controller and of controlling the at least one switching device; and
further comprising providing the BMU coupled to the memory controller by a system management bus (SMBus); and using the BMU to detect the active status of the memory controller by monitoring the SMBus for the presence of valid SMBus communication.

18. The method of claim 17, wherein the storage memory controller circuit is a RAID controller card; wherein the backup battery system is a replaceable smart battery pack; and wherein the method further comprises providing a system management bus (SMBus) that couples the BMU to the memory controller, and using the BMU to monitor the status of the memory controller by monitoring the SMBus for the presence of valid SMBus communication, wherein the presence of valid SMBus communication signals on the SMBus indicates that the memory controller is active and absence of the valid SMBus communication signals on the SMBus indicates that the memory controller is inactive.

19. The method of claim 17, further comprising using the BMU to pull down at least one of SMCL or SMDA lines of the SMBus to make at least one of the SMCL or SMDA lines low when when there is no external power provided to the memory controller system-side circuitry; and detecting a triggered rising edge on the at least one SMCL or SMDA line when the memory controller system-side circuitry is powered up by external power and responding thereto by controlling the at least one switching device to selectively electrically couple the one or more battery cells to each of the BMU and the one or more of the system load components.

20. A method of managing battery life of a backup battery system of a storage memory controller circuit, the method comprising the steps of:
providing a storage memory controller circuit configured for controlling the transfer of data to and from an external data storage system, the storage memory controller circuit having a system-side circuitry that includes one or more load components that includes a memory controller;
providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU);
providing at least one switching device coupled in the power path between the one or more battery cells and each of the BMU and one or more of the system load components;
monitoring the status of the memory controller;
controlling the at least one switching device to selectively electrically isolate the one or more battery cells from each of the BMU and the one or more of the system load components when the monitored status of the memory controller has been inactive for greater than a predetermined period of time;
using the BMU to perform the steps of monitoring the status of the memory controller and of controlling the at least one switching device; and
further comprising providing the BMU and the one or more system load components as each being coupled to the one or more battery cells by a common portion of the power path with the at least one switching device being coupled in the common portion of the power path between the one or more battery cells and each of the BMU and the system load components; and using the BMU to control the at least one switching device to simultaneously electrically isolate both the BMU and the system load components from the one or more battery cells.

21. A method of managing battery life of a backup battery system of a storage memory controller circuit, the method comprising the steps of:
providing a storage memory controller circuit configured for controlling the transfer of data to and from an external data storage system, the storage memory controller circuit having a system-side circuitry that includes one or more load components that includes a memory controller;
providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU);
providing at least one switching device coupled in the power path between the one or more battery cells and each of the BMU and one or more of the system load components;
monitoring the status of the memory controller;
controlling the at least one switching device to selectively electrically isolate the one or more battery cells from each of the BMU and the one or more of the system load components when the monitored status of the memory controller has been inactive for greater than a predetermined period of time;
using the BMU to perform the steps of monitoring the status of the memory controller and of controlling the at least one switching device; and
further comprising providing the BMU and the one or more system load components as each being coupled to the one or more battery cells by a separate dedicated portion of the power path with a separate dedicated switching device being coupled in the separate dedicated power path portion between the one or more battery cells and each one of the BMU and the separate system load components; and using the BMU to independently control each of the separate dedicated switching devices to selectively electrically isolate each of the BMU and the system load components from the one or more battery cells.

22. The method of claim 21, further comprising:
providing the BMU in backup battery system side circuitry as being separate from the memory controller system-side circuitry;
providing the one or more system load components of the memory controller system-side circuitry as being coupled to the one or more battery cells by a separate portion of the power path comprise at least a separate memory controller, separate battery backup circuitry, separate charger circuitry, and separate learn cycle circuitry;
providing the BMU as being coupled by a respective corresponding individual control path to each of the separate switching devices; and
independently controlling each of the separate switching devices to selectively electrically isolate each of the BMU, memory controller, separate battery backup circuitry, separate charger circuitry, and separate learn cycle circuitry from the one or more battery cells in order to selectively disallow flow of leakage current from the one or more battery cells to any selected one or any selected combination of the BMU and individual system load components of the memory controller system-side circuitry.

23. The method of claim 22, further comprising independently controlling each of the separate switching devices to selectively disallow flow of leakage current from the one or more battery cells to only a selected one of the individual system load components of the memory controller system-side circuitry in a manner that is independent of the BMU.

24. The method of claim 22, further comprising independently controlling each of the separate switching devices to selectively disallow flow of leakage current from the one or more battery cells to a selected combination of two or more of the individual system load components of the memory controller system-side circuitry in a manner that is independent of the BMU.

25. A backup battery system configured for coupling to and providing backup power to one or more system load components of a storage memory controller circuit that includes a memory controller, the battery system comprising:
one or more battery cells configured for coupling by a power path to provide electrical power to the one or more system load components of the storage memory controller circuit;
a battery management unit (BMU) coupled to receive electrical power from the one or more battery cells via the power path;
at least one switching device coupled in the power path between the one or more battery cells and the BMU, and configured for coupling between the one or more battery cells and one or more of the system load components;
at least one switching device coupled in the power path between the one or more battery cells and each of the BMU and one or more of the system load components; and
wherein the BMU is configured for coupling to monitor the status of the memory controller and for coupling to control the at least one switching device to selectively electrically isolate the one or more battery cells from each of the BMU and the one or more of the system load components when the BMU detects that the status of the memory controller has been inactive for greater than a predetermined period of time;
wherein the BMU is configured to perform one or more gas gauge and charge/discharge routine functions when the BMU detects that the status of the memory controller has been active within the predetermined period of time; and wherein the BMU is configured to perform no gas gauge and charge/discharge routine functions when the BMU detects that the status of the memory controller has been inactive for greater than the predetermined period of time;
wherein the BMU is configured to:
measure the elapsed time since last memory controller activity,
perform one or more gas gauge and charge/discharge routine functions when the measured elapsed time is less than or equal to the predetermined period of time, and
control the at least one switching device to selectively electrically isolate the one or more battery cells from each of the BMU and the one or more of the system load components, and perform no gas gauge and charge/discharge routine functions when the measured elapsed time is greater than the predetermined period of time; and wherein the backup battery system is a replaceable battery pack; wherein the BMU is configured for coupling to a RAID controller card by a system management bus (SMBus); wherein the BMU is configured to monitor the status of the memory controller by monitoring the SMBus for the presence of valid SMBus communication; and wherein the presence of valid SMBus communication signals on the SMBus indicates that the memory controller is active and absence of the valid SMBus communication signals on the SMBus indicates that the memory controller is inactive.

26. An information handling system, comprising:
a storage memory controller circuit for controlling the transfer of data to and from an external data storage system, the storage memory controller circuit including a back up battery system coupled to memory controller system-side circuitry, the backup battery system including one or more battery cells and a battery management unit (BMU), the memory controller system-side circuitry including one or more system load components that include a memory controller, and each of the BMU and the system load components being coupled by a power path to receive electrical power from the one or more battery cells;
at least one switching device coupled in the power path between the one or more battery cells and each of the BMU and one or more of the system load components; and
at least one processing device;
wherein the at least one processing device is coupled to monitor the status of the memory controller and is coupled to control the at least one switching device to selectively electrically isolate the one or more battery cells from each of the BMU and the one or more of the system load components when the at least one processing device detects that the status of the memory controller has been inactive for greater than a predetermined period of time; and
where the information handling system further comprises:
at least one first switching device coupled in the power path between the one or more battery cells and the one or more of the system load components, and
at least one second switching device coupled in the power path between the one or more battery cells and the BMU, the second switching device being separate and different from the first switching device.

27. A method of managing battery life of a backup battery system of a storage memory controller circuit, the method comprising the steps of:
providing a storage memory controller circuit configured for controlling the transfer of data to and from an external data storage system, the storage memory controller circuit having a system-side circuitry that includes one or more load components that includes a memory controller;
providing the storage memory controller circuit with a backup battery system coupled by a power path to the storage memory controller system-side circuitry and configured for providing a power source by the power path for the one or more load components during occurrences of a system power loss condition, the backup battery system including one or more battery cells and a battery management unit (BMU);
providing at least one switching device coupled in the power path between the one or more battery cells and each of the BMU and one or more of the system load components;
monitoring the status of the memory controller; and
controlling the at least one switching device to selectively electrically isolate the one or more battery cells from each of the BMU and the one or more of the system load components when the monitored status of the memory controller has been inactive for greater than a predetermined period of time;
where the method further comprises:
providing at least one first switching device coupled in the power path between the one or more battery cells and the one or more of the system load components,
providing at least one second switching device coupled in the power path between the one or more battery cells and the BMU, the second switching device being separate and different from the first switching device, and
controlling the at first and second switching devices to selectively electrically isolate the one or more battery cells from each of the BMU and the one or more of the system load components when the monitored status of the memory controller has been inactive for greater than a predetermined period of time.

* * * * *